April 29, 1930.  G. F. HAMILTON ET AL  1,756,641
GROUND STAKE
Filed Jan. 5, 1928
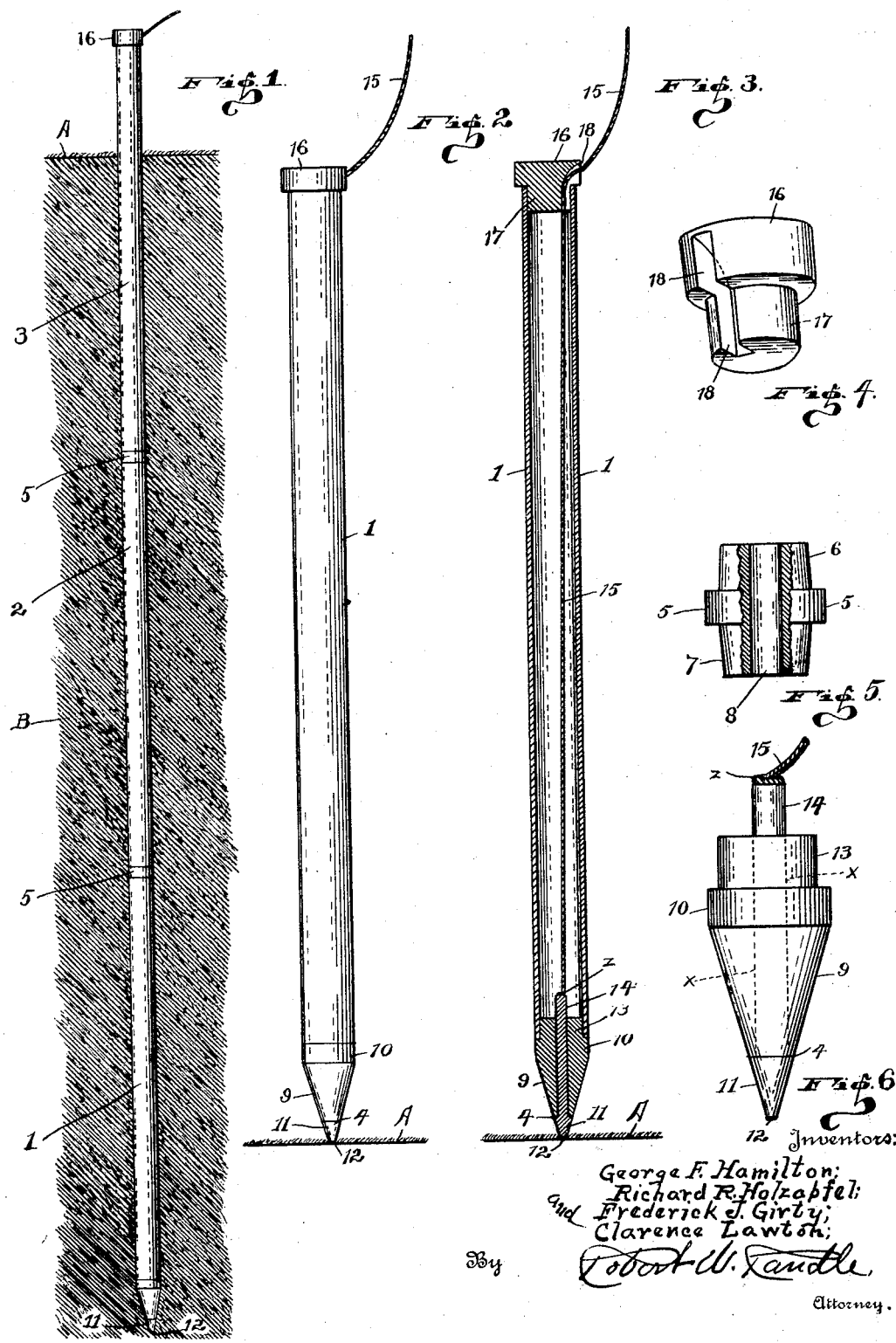
Inventors:
George F. Hamilton;
Richard R. Holzapfel;
Frederick J. Girty;
Clarence Lawton;
By Robert W. Randle,
Attorney.

Patented Apr. 29, 1930

1,756,641

UNITED STATES PATENT OFFICE

GEORGE F. HAMILTON, RICHARD R. HOLZAPFEL, FREDERICK J. GIRTY, AND CLARENCE LAWTON, OF RICHMOND, INDIANA

GROUND STAKE

Application filed January 5, 1928. Serial No. 244,667.

The object of our invention, broadly speaking, is to provide a stake for the terminal of ground wires for electrical currents, the same being simple in character, strong and durable in construction, highly efficient in practice, comparatively easy of installation, and which can be manufactured and sold at a comparatively low price.

It is a well known fact that, in the installation of wires for electric current, it is frequently desirable and in some instances imperative that there be a so-called ground wire, and in order that the same shall be able to afford the maximum of efficiency, such wire should extend down into the earth for a considerable distance, where it will at all times be in connection with moisture. In order to insure the proper depth it is usually customary to drive an iron stake, as a rod or pipe, into the earth and then secure the ground wire thereto at the stake's exposed upper end. Now as iron is not the most efficient conductor of electricity, and as said stake will rust and deteriorate, therefore, to overcome all of said objections with a minimum of time, labor, and expense devoted thereto, is the paramount object of this present invention. It is a well known fact that copper or brass are the most efficient conductors of electricity, and at the same time will not deteriorate by reason of moisture, but by reason of their cost they are not often used for grounding wires. This invention is intended to permit the use of brass or copper, or other material of high conductivity without materially increasing the cost above that of iron or other cheaper materials, and at the same time providing a stake which can be more deeply inserted into the earth than has heretofore been practical without the operator getting off the ground when driving it, and at the same time providing a stake which can be packed in a comparatively small space of a relatively short length for shipment and handling.

Other minor objects and particular advantages of the invention will be suggested in the course of the following description, and that which is new will be correlated in the appended claim. The means for carrying out the principles of our invention in a practical and efficient manner is shown in the accompanying drawings, in which—Figure 1 shows our invention in elevation as in its final operative position, after being driven into the ground. Figure 2 shows the first section ready to be driven into the ground. Figure 3 is a longitudinal central section of the parts shown in Fig. 2. Figure 4 is a perspective view of the head or cap alone. Figure 5 is an elevation, partly in section, of one of the couplings. And Figure 6 is a side elevation of the lower end portions and the terminal member of the device.

Similar indices denote like parts throughout the several views. In order that the construction, the operation, and the several advantages of the invention may be more fully understood and appreciated, we will now take up a detailed description thereof in which we will set forth the same as comprehensively as we may. In the drawings letter A denotes the surface of the ground; and letter B denotes the earth below the ground line.

Our invention comprises a plurality of iron pipe sections, as the sections 1, 2 and 3, for instance, all of which are identical with each other and without threads or other attaching means at their ends, in other words they are merely plain sections of iron pipe.

Also we provide a plurality of smooth iron coupling members, all identical with each other, and they are of novel construction and each comprises a central disc portion 5, an upper stem 6 and a lower stem 7, all integral with each other, with all of said parts formed round in cross section. The disc portion 5 is of the same diameter as are the pipe sections, with the upper stem 6 adapted to fit snugly into the lower end of any one of said pipe sections, and with the lower stem 7 adapted to fit into the upper end of another one of said pipe sections. Said stems 6 and 7 are slightly tapered whereby they are easily entered into the ends of the pipes and by which when the end of a pipe comes into contact with the disc 5 the parts will be rather tightly coupled together. A central aperture 8 is formed through each of the couplings, that is through the members 5, 6 and 7, for the purpose hereinafter explained.

Regardless of the number of pipe sections employed we provide a single body cone 9 formed of iron, the same having a truncated lower end forming a small circular face at the line 4, for instance. The upper portion of the member 9 merges into a disc portion 10, which is of the same diameter as that of the pipe sections. The upper end of said disc portion forms a flat face to receive thereon the lower end of the member 1. Extending upwardly from the disc 10, concentric and integral therewith, is the stem 13 which is adapted to fit snugly into the lower end of the pipe section 1. A central aperture $x$ is formed through the members 9, 10 and 13, as indicated in dotted lines in Fig. 6.

Numeral 11 denotes a cone-shaped copper terminal, having its upper end contacting with the lower end of the member 9 and then extending downward to a point 12, and with its periphery forming a continuation of the periphery of the member 9 whereby the members 9 and 11 form a complete cone. The member 11 is formed of copper or brass or other material of high conductibility. Extending upward from the center of the upper end of the terminal 11 and integral therewith is a copper rod or electrode 14 which extends through and fits in the aperture $x$, and it projects above the stem 13, and is of less diameter than is the interior of the pipe sections.

Numeral 15 denotes the conductor, which is formed of a length of copper or brass wire, or other electric conducting material, one end of which is soldered or otherwise secured to said electrode 14, as indicated at $z$ in Figs. 3 and 6.

Also a single head or cap 16 is provided for our stake, the same being formed of iron and adapted to fit on the upper end of either section of pipe, and the same has a tapered stem 17 extending down into the pipe similar to that of the stems 6, 7 and 13. A curved channel 18 is formed in the side of the stem 17 and the underside of the head 16, through which the conductor 15 may freely pass when the cap 16 is in place on the pipe 1, as shown in Figs. 1, 2 and 3.

The parts are to be assembled as follows:

First, one end of the conductor 15 is autogenously connected to the member 14, after the members 9 and 11 are assembled, as in Fig. 6. The other end of the conductor is then run through the pipe 1, which latter is then pressed onto the stem 13 until it contacts with the disc 10. The head 16 is then placed on the upper end of the pipe 1, with the stem 17 inserted in said pipe, and with the conductor 15 extending out through the channel 18. The device may now be placed in the position as shown in Fig. 2, then with a sledge the device may be driven into the earth for a short distance, after which the head should be removed. The conductor 15 is then run through the aperture 8 in a coupling and the stem 7 inserted into the upper end of the pipe 1. The conductor 15 is then run through the pipe 2, and the lower end of pipe 2 is then placed around the stem 6, after which the head 16 is placed on the upper end of pipe 2, after which the device may be again driven down as before. When the upper end of the pipe 2 is near the ground then section 3 and an additional coupling may be placed in position as was done with section 2, and then after the third section has been driven down to the depth desired the conductor may be attached wherever desired, which will place the stake in condition for use. Additional pipe sections and couplings may be employed if it is desired that the terminal 11 be located deeper in the ground, but in each instance the head or cap 16 is left on the upper end of the last pipe section to be placed in position.

We desire that it be understood that various changes may be made in the several details herein set forth without departing from the spirit of the invention or sacrificing any of the advantages thereof which are new and useful.

Having now fully shown and described our invention, what we claim, and desire to secure by Letters Patent of the United States, is—

A ground stake for electric current comprising a plurality of tubular sections, a coupling for connecting each two of the sections detchably together by pressure, a downwardly tapering cone member attached to the lower end of the lower section by pressure, a pointed terminal carried by the lower end of the cone member and forming a continuation thereof in contour, an electrode extending from said terminal through said cone member, a conductor autogenously attached to said electrode and extending upward through all of said sections of pipe and couplings, and a cap attached by pressure to the upper end of the upper section of pipe and having a curved channel therein through which said conductor extends from the upper pipe outward through the side of said cap whereby the conductor will not be damaged as the cap is struck to drive the device into the ground.

In testimony whereof we have hereunto subscribed our names to this specification.

GEORGE F. HAMILTON.
RICHARD R. HOLZAPFEL.
FREDERICK J. GIRTY.
CLARENCE LAWTON.